United States Patent [19]

Sorgeloos et al.

[11] Patent Number: 4,593,647
[45] Date of Patent: Jun. 10, 1986

[54] METHOD AND DEVICE OF PRODUCING ARTEMIA OFFSPRING

[75] Inventors: Patrick P. Sorgeloos, Deinze; Danny H. Versichele, Zele; Philippe P. J. M. Leger, Wervik; Patrick A. Lavens, Tornhout, all of Belgium

[73] Assignee: Artemia N.V., Antwerp, Belgium

[21] Appl. No.: 532,967

[22] Filed: Sep. 16, 1983

[30] Foreign Application Priority Data

Sep. 24, 1982 [NL] Netherlands .................. 8203710

[51] Int. Cl.$^4$ ............................................. A01K 61/00
[52] U.S. Cl. .................................................. 119/2
[58] Field of Search ............................................ 119/2

[56] References Cited

U.S. PATENT DOCUMENTS

| | | | |
|---|---|---|---|
| 3,029,784 | 4/1962 | Elbreder | 119/2 |
| 3,696,788 | 10/1972 | Day et al. | 119/2 |
| 3,967,585 | 7/1976 | Monaco | 119/2 |
| 4,163,064 | 7/1979 | Hill | 426/2 |
| 4,368,691 | 1/1983 | Brune | 119/2 |

FOREIGN PATENT DOCUMENTS

| | | | |
|---|---|---|---|
| 1047521 | 12/1958 | Fed. Rep. of Germany | |
| 1291991 | 4/1972 | United Kingdom | |
| 1592085 | 5/1978 | United Kingdom | |
| 1600832 | 10/1981 | United Kingdom | 119/2 |

*Primary Examiner*—Hugh R. Chamblee
*Attorney, Agent, or Firm*—Birch, Stewart, Kolasch & Birch

[57] ABSTRACT

Artemia (14,90) are kept under such conditions as high density in a flowing aqua-culture (2) that either nauplii (90) or cysts (14) are deposited as offspring (14,90).

A treatment inducing cyclic cysts production consists of a cyclic reduction of the oxygen concentration of the flowing aqua-culture (2).

A device (1,44) for depositing only one selected type of offspring (14,90) comprises for the production of cysts (14) inducing means (12,53,64,67) for the cyclic reduction of the oxygen concentration.

A packing (67) of such offspring (14,90) is provided with a label (68) indicating a specification predetermined by the conditions the flowing aqua-culture (2) had been operated at.

Methods for feeding Artemia (14,90) are characterized by the use of agricultural derivatives (7) and/or chicken manure (7).

A method for preparing food (14,90) is characterized by the use of nauplii (90) and/or cysts (14) produced in the flowing aqua-culture (2) and/or by the use of particles coated with a food additive.

15 Claims, 4 Drawing Figures

METHOD AND DEVICE OF PRODUCING ARTEMIA OFFSPRING

BACKGROUND OF THE INVENTION

The invention relates to a method of producing Artemia offspring in which the reproducing Artemia are kept in an aqua-culture and the offspring are harvested.

This method is known and as far as the production of cysts is concerned it is described in the article "Controlled production of Artemia cysts in batch cultures" by D. Versichele and P. Sorgeloos in the book "Brine Shrimp Artemia", Vol. 3, "Ecology culturing use in aqua-culture", authors: G. Persoone, P. Sorgeloos, O. Roels and E. Jaspers, page 231 to 246, Universa Press, Wetteren, Belgium.

Artemia, the brine shrimp, is found restrictively in salt lakes throughout the world. Due to the extreme ecologic conditions in these biotopes, for example, a salinity of more than 100 gs per liter of water, predators and food competitors of Artemia are lacking, and the Artemia can flourish in these biotopes. As a result of varying environmental conditions, for example, drying up of the salt lake, the manner of reproduction changes in a sense such that the reproduction changes from an ovoviviparous reproduction (living offspring) into an oviparous reproduction (inactive offspring). As living offspring nauplii are produced which grow up to adult Artemia within 9 days to 6 weeks (depending on the culture conditions). In the case of the oviparous reproduction the embryonic development is reversibly discontinued during gastrulation. Each gastrula is surrounded by a sheel impregnated with a heamatine-like substance. These encapsulated gastrulae are termed cysts, which are excreted in the water. The cysts remain floating in the salt water and subsequently are washed on the shore. After processing, the cysts can be dried or kept under anaerobic conditions for many years. After the cysts are again placed in sea water the metabolism of the embryo is activated and after a few hours a free-swimming nauplius is set free of the cyst.

Artemia nauplii are used as food for the larvae of fish and crustacea. Because Artemia cysts can be kept for a long time and free-swimming nauplii become available a few hours after introduction of the cysts into salt water by expansion of the cysts, Artemia cysts constitute an ideal source of food for larvae of fish or crustacea.

However, the production of Artemia offspring in nature is too low to meet the need. Apart therefrom Artemia offspring produced in nature have the disadvantage that they may be contaminated by any kind of toxic compound, for example chlorinated hydrocarbons.

Scientific tests revealed that the batch culture production of one type of offspring on a technical scale is not feasible, since the batch culture production of Artemia offspring has the drawback that due to pollution, for example, by faeces, metabolites, peeling and bacteria, the water quality is deteriorated so that the batch culture has to be refreshed each week, even in the case in which the offspring producing Artemia is kept at low density in the batch culture. However, a low density of Artemia results in a low production per cubic meter and a low degree of usefulness of the food added to the batch culture. Due to the necessarily low density of Artemia in a batch culture the volume in which the Artemia are swimming is smaller than the overall volume of the batch culture, which means that only part of the total volume is populated by the Artemia. On the one hand this means that the food present in the unpopulated volume, remains unused (the degree of use of the available food is, therefore, low) and on the other hand it means that the quantity of food in the populated volume has to meet the daily need.

SUMMARY OF THE INVENTION

The invention has for its object to provide an improved method which avoids the disadvantages inherent in the use of batch culture by keeping the Artemia in high density in a flowing aqua-culture. The density is preferably of the order of magnitude of at least 1000 animals per liter.

In the flowing aqua-culture the water has a residence time of, for example, about one hour. This period of time is so short that the excretion produced by the Artemia only slightly affects the water quality in the aqua-culture. This permits increasing the density of the Artemia in the aqua-culture, while at the same time the degree of use of the food is raised.

The amount of fresh water to be supplied per hour to the aqua-culture can be reduced by purifying and subsequently recycling at least part of the water conducted away as a carrier of offspring and excreta after harvesting the offspring produced.

If cysts are produced in the flowing aqua-culture, the Artemia are subjected, in order to the production of Artemia cysts, to a process inducing a cyclic cyst production, preferably by decreasing the oxygen concentration in the flowing aqua-culture as a process, inducing cyst products. When used in a batch culture this method has the disadvantage that it takes a very long time (ten minutes) before, after stopping the supply of air to the batch culture, the oxygen concentration has become so low that a shift towards an oviparous reproduction is brought about. Moreover, it takes a long time before, after restart of the air supply, the oxygen concentration has attained the optimum value so that, due to this long period of lack of oxygen, high mortality occurs.

With the higher density of Artemia the need of oxygen in the flowing aqua-culture increases. This means that after stopping the air supply through the aerating means the oxygen concentration in the aqua-culture drops more rapidly so that within a shorter time a lower oxygen concentration is attained. As a result the stress conditions become more extreme. Since the Artemia are thus stimulated earlier to oviparous reproduction, it is possible to reduce the magnitude of another stress-determining factor, preferably by decreasing the conventional salinity of the water in the aqua-culture of more than 90 gs of salt per liter of water (ppt). Preferably the aqua-culture is flushed with water, the salinity of which lies between 15 and 90 ppt and more, preferably the aqua-culture is flushed with sea water.

In the case in which for reducing the oxygen concentration in the aqua-culture the air supply is stopped at the aerating means, the water circulation produced by the gas bubbles formed by the aerating means will decrease. This may give rise to clogging of the sieve means, as a result of which the aqua-culture spills over and loss of animals occurs.

During the cyclic reduction of the oxygen concentration, clogging and overflow of the aqua-culture can be avoided by maintaining the vertical water circulation with the aid of the gas bubbles generated by the aerating means. This is preferably achieved by reducing the oxygen concentration by supplying nitrogen gas to the aqua-culture.

By reducing the salinity of the water the specific weight of the water decreases and becomes equal to the specific weight of the produced cysts. The produced cysts will no longer float on the water, but remain in suspension owing to the strong water circulation so that the produced cysts are preferably harvested from the stream of water leaving the aqua-culture.

The invention furthermore relates to and provides a device for producing Artemia offspring in aqua-culture comprising a water basin, supplementary food means, sieve means for removing excreta and produced offspring from the aqua-culture, while retaining the Artemia producing offspring, aerating means and harvesting means and is characterized in that the device is provided with means ensuring the deposition of only one selected type of the two potential types of offspring, i.e. nauplii and cysts and in that the water basin is provided with a water inlet and a water outlet for producing a flowing aqua-culture.

The invention furthermore relates to a method of feeding Artemia in which the Artemia are fed by a micronized product.

This method is known. Artemia are obligatory "particle feeders" and in nature they feed on algae and bacteria. On an industrial scale Artemia are fed on micronized products such as dried blue sea-weeds, yeast, wheat-, fish- or rice-meal, egg yolk and homogenized liver. However, these products are expensive. In Southeast Asia manually ground rice chaff is used instead of the above-mentioned products, which is a waste product of the treatment of rice and hence cheap. Rice chaff is hardly usable in Europe as a food for feeding Artemia on an industrial scale because micronizing rice chaff brings about high costs. Apart therefrom the rice chaff available in Europe is of highly varying qualities and may be contaminated with pesticides.

The invention has for its object to provide a micronized product improved in this respect since the Artemia are fed on a carbohydrate- or protein-lean maize derivative, a soya derivative and/or a manioc derivative.

From an economic point of view the use of these derivatives is interesting because they are largely available and because, for example, the maize derivative is a waste product of the maize treatment, for example, maize stem parts, mechanically worn-off parts of the grains and/or dust of grain strains, the maize derivative is cheap. Furthermore the use of the maize derivative has the practical advantage that, for example, in contrast to rice chaff, it has a better food conversion which means that the nutrient substances contained in the maize derivative are more readily available so that as compared with rice chaff a lower amount of maize derivative is required. Finally, the maize derivative contains less soluble substances so that pollution of the aqua-culture is reduced and the risk of clogging of the strainer is lowered and the water emanating from the aqua-culture need be purified to a lesser extent.

The use of the carbohydrate- and/or protein-lean maize derivative in itself is remarkable because the maize derivative does not satisfy the conditions mentioned in literature for Artemia food. Nevertheless it has been found that the carbohydrate- and/or protein-lean maize derivative has a high nutritional value for the Artemia.

The invention also relates to a different method of feeding Artemia, in which the Artemia are fed on a micronized product and which is characterized in that the Artemia are fed on micronized chicken manure. Micronized chicken manure is an excellent food for Artemia. Owing to the short resident time of food in the gastric-intestinal canal of the chicken, chicken manure still contains a high concentration of nutritional substances. Moreover, chicken manure has a high food conversion value and it contains adequate particulate carrier material. Like the other derivatives chicken manure is cheap and largely available.

The invention furthermore relates to a method of preparing food for larvae of fish crustacea in which nauplii released by the development of Artemia cysts or obtained by ovoviviparous reproduction are fed to the larvae and which is characterized in that Artemia cysts or nauplii produced in a flowing aqua-culture are employed.

Since in contrast to nature the Artemia in aqua-culture are fed on terrestric food (rice chaff, maize derivatives and the like), the nutritional value of the nauplii directly or indirectly obtained through cysts will not satisfy the food need of marine animals. The nutritional value of nauplii can be adjusted to the food need of larvae by adding preferably such food additives to the aqua-culture that the food composition of the nauplii corresponds to the food need of the larvae.

The invention furthermore relates to a method of adjusting the food composition of nauplii obtained by Artemia and serving as food for larvae of fish or crustacea to the food need of the larvae characterized in that at least one food additive in the form of particle coatings is added to the Artemia. The food additive, preferably fish oil and more preferably codliver oil can be added in the form of a coating on particles, preferably rice, starch grains having a suitable particle-size distribution and satisfactory coating properties to Artemia depositing offspring. It is furthermore preferred to use particles of food intended for consumption by Artemia. In this case the carrier of the coating represents the basic food.

BRIEF DESCRIPTION OF DRAWINGS

The above-mentioned and further features will be described more fully with reference to the drawing of a few non-limitative examples.

DETAILED DESCRIPTION

Figure 1:
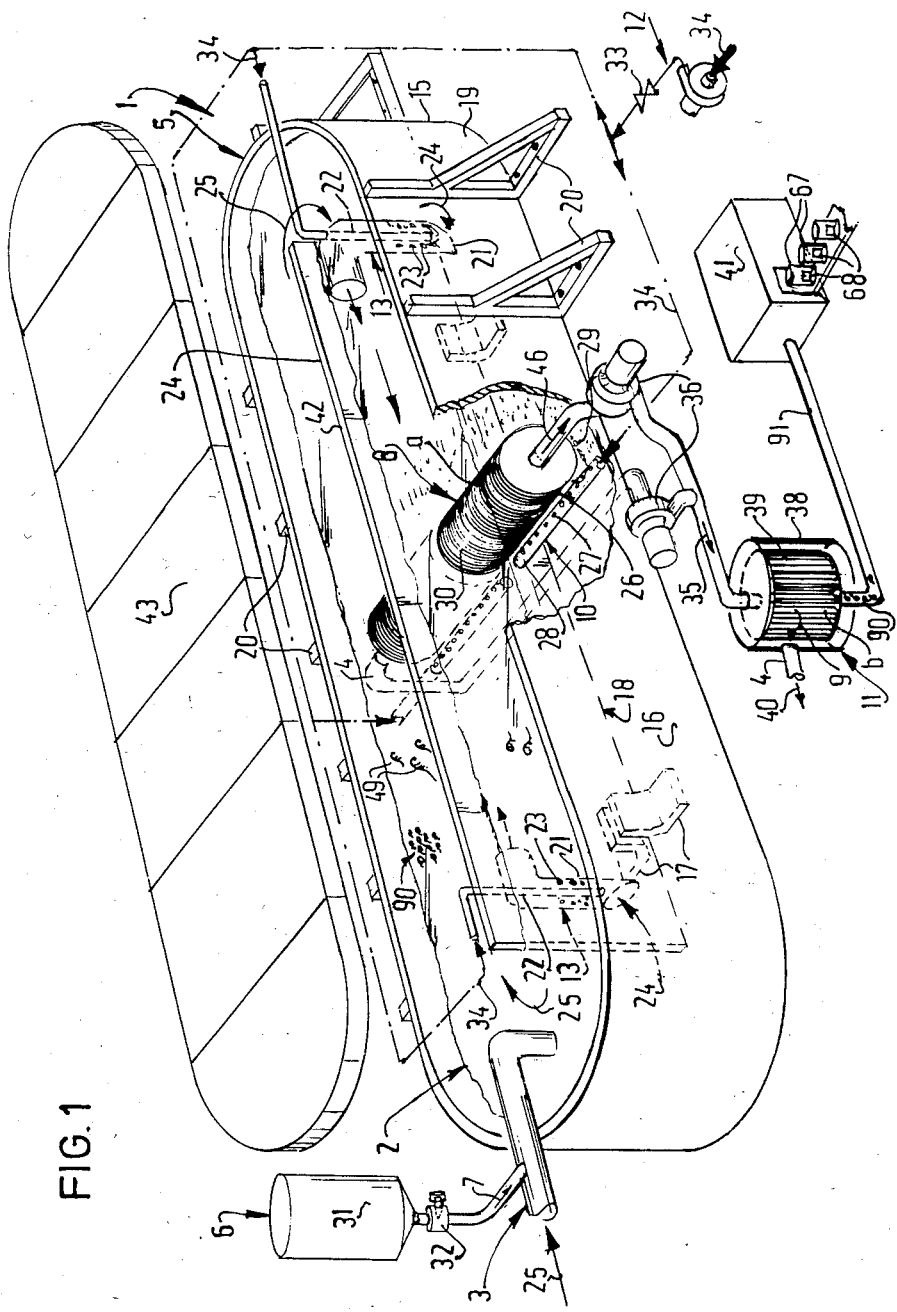
FIGS. 1 and 2 each show a perspective, fragmentary view of different devices for producing Artemia offspring in flowing aqua-culture, nauplii being produced in the device of FIG. 1 and cysts in the device of FIG. 2.

FIG. 1 shows a device 1 embodying the invention for producing Artemia nauplii 90 in a flowing aqua-culture 2. The device 1 comprises a water basin 5 having a water inlet 3 and a water outlet 4, food supplementing means 6 for adding food 7 to the aqua-culture 2, sieve means for conducting away waste and produced nauplii 90 via the water outlet 4 while retaining the Artemia 49, aerating means 10, water circulating means 13, harvesting means 11 for harvesting the produced nauplii 90 and depositing means 12 ensuring that the Artemia 49 deposit only one selected type of off-spring, in this case nauplii 90, of the two potential types of off-spring 14, 90 i.e. cysts 14 and nauplii 90.

The water basin 5 mainly has the shape of an endless raceway and comprises a wall 15, a bottom 16 and a central wall 42, which is connected with the bottom 16 through supports 17 in a manner such that the lower longitudinal surface 18 of the wall 42 is free of the bottom 16. Along the circumference of the wall 15 struts 20 are arranged on the outer surface 19 of the wall 15.

The water circulating means 13, for example, an "air water lift" comprise two substantially knee-shaped pipes 21 and air inlets 22 extending down in the pipes 21. The air 34 brought through each air inlet 22 towards the lower end of the associated pipe 21 rises in the form of gas bubbles 23 carrying along water 24 in the pipe 21, after which the water 24 flows in a horizontal direction out of the pipe 21. The pipes 21 are relatively disposed in the device embodying the invention in a manner such that a circulating stream 25 is generated in the basin 5.

The food supplementing means 6 comprise a container 31 for food 7. The food 7 is dosed by dosing means 32 through the water inlet 3 and supplied to the water 25 in the basin 5. The food 7 preferably consists of micronized carbohydrate- and/or protein-lean maize derivatives of chicken manure.

Referring to FIG. 1, the deposition means 12 comprises a valve 33 by which the supply of air 34 to the water circulating means 13 and the water aerating means 10 can be regulated so that the conditions in the aqua-culture 2 for the Artemia 49 are at an optimum for depositing nauplii 90.

The sieve means 8 disposed in the water basin 5 preferably comprises a wedge-shaped strainer 26. The embodiment of FIG. 1 shows a cylindrical, wedge-shaped strainer 26. Below the wedge-shaped strainer 26 is arranged the aerating means 10 comprising a pipe 28 having holes 27 in a manner such that gas bubbles 29 produced by the aerating means 10 flow along slots 30 of the wedge-sgaped strainer so that clogging of the strainer slots 30 is avoided.

The slot width a of the wedge strainer is such that while the Artemia 49 are retained, the water 35 containing the nauplii 90 and excreta 9 is removed from the aqua-culture through the water outlet 4. Through pumps 36 and duct 37 the water 35 is conveyed towards the harvesting means 11.

The harvesting means 11 comprise a cylindrical wedge strainer 39 immersed in a container 38. The wedge strainer 39 has a slot width b varying between 100 and 200 μms. The wedge-strainer slot width b is such that water 40 containing excreta flows through the wedge strainer 39 and is evacuated through the outlet 4 of the container 38. The nauplii 90 sieved by means of the wedge strainer 39 from the excreta containing water 35 are conveyed through a duct 91 for processing towards a processing unit 41.

Figure 2:
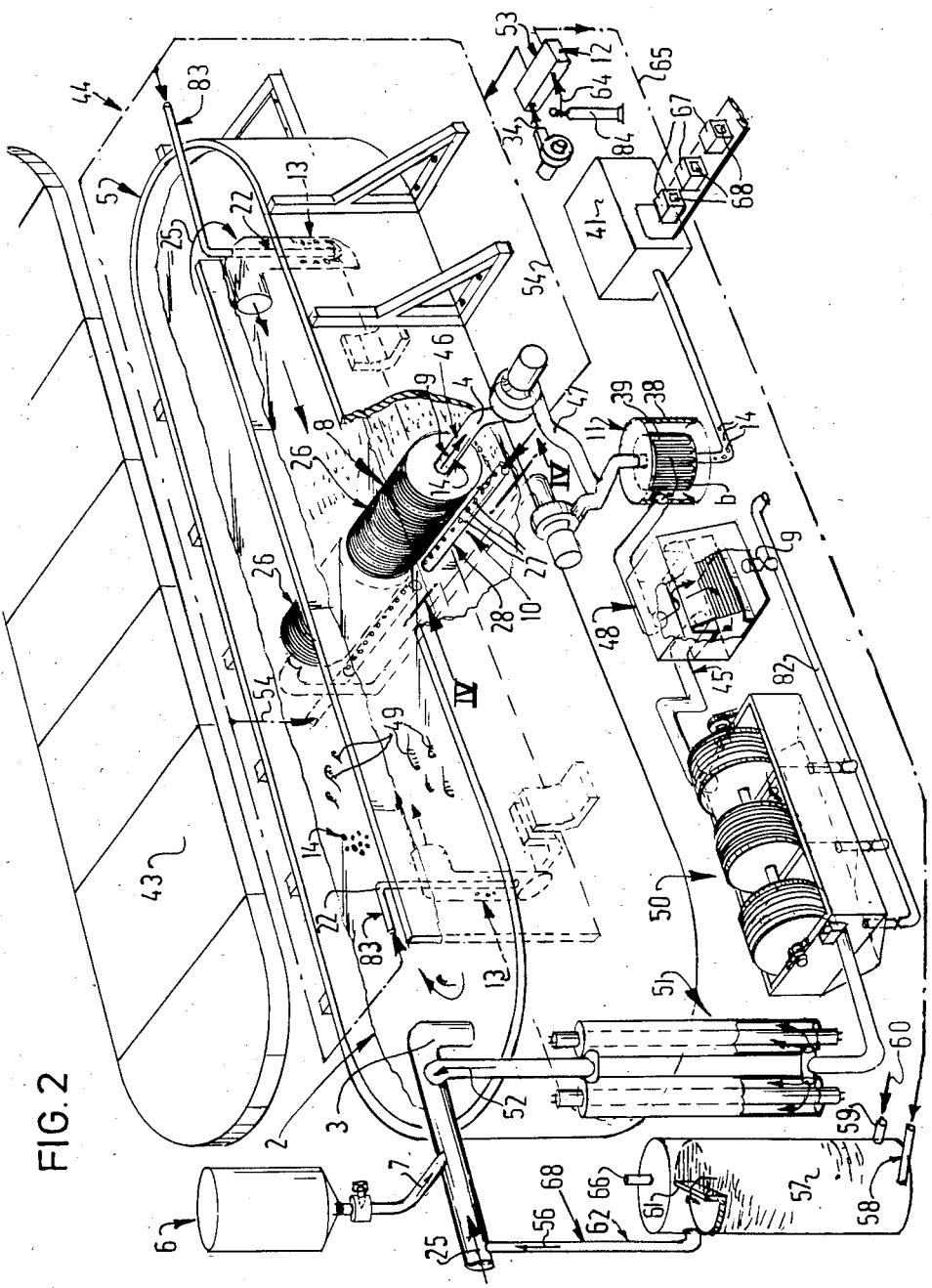

FIG. 2 shows a different device 44 embodying the invention in which the water inlet 3, the water basin 5 and the water outlet 4 are included in a recycling circulation. In this device 44 Artemia cysts 14 are produced. The deposition means 12 comprise for this purpose induction means by which the Artemia 49 producing the cysts 14 are subjected to treatment inducing a cyclic cyst production. In the case of FIG. 2 the treatment inducing the cyclic cyst production consists of the cyclic reduction of the oxygen concentration in the flowing aqua-culture 2. The induction means 12 comprises a control-unit 53 by which air 34 and nitrogen gas 64 are alternately supplied through ducts 83 and 54 respectively to the air inlet 22 in the water circulating means 13 and the pipe 28 with holes 27 in the water aerating means 10 to the aqua-culture 2. During the period of nitrogen gas supply to the aqua-culture the oxygen concentration in the aqua-culture 2 drops to an extent such that a deposition of cysts 14 is induced. In the device 44 the oxygen concentration in the aqua-culture 2 is reduced more rapidly because during the period in which nitrogen gas 64 is supplied to the aqua-culture 2 through the water circulating means 13 and the aerating means 10 oxygen-lean water 56 is supplied to the aqua-culture 2 through the water inlet 3. The water 56 is oxygen-depleted in a gas exchange unit 57. This unit 57 is provided on the underside with two inlets 58 and 59. Through the inlet 59 water 60 is supplied to the unit 57. Above, in the unit 57, the water passes along an over-flow 61 and is then supplied through a duct 62 to the water inlet 3. During the period in which, through the control-unit 53, nitrogen gas 64 is supplied through the ducts 83 and 54 to the aqua-culture 2 nitrogen gas 64 is also supplied through the duct 65 by way of the inlet 58 to the gas exchange unit 57. In the gas exchange unit 57 the nitrogen gas dissolved in the water 60 is replaced by the nitrogen gas 64 so that through the duct 62 oxygen-lean, nitrogen-gas enriched water 56 is supplied to the aqua-culture 2 and oxygen-enriched nitrogen gas is conducted away from the gas exchange unit 57 through the vent 66.

The nitrogen gas 64 required for the cyclic reduction of the oxygen concentration in the flowing aqua-culture 2 originates from a container 84 containing the nitrogen gas 64.

As the case may be, the oxygen concentration in the aqua-culture 2 may be reduced by interrupting the supply of air 34 to at least part of the aerating means 10 and/or the water circulating means 13.

While Artemia 49 are retained water 46 containing cysts 14 and excreta 9 is removed through the wedge strainer 26 from the aqua-culture and conveyed through duct 47 to the harvesting means 11. After the removal of the cysts 14 particle-sized excreta is sieved out of the water 46 in a strainer unit 48, the water 46 is purified in a biological purifying unit 50 from organic refuse and in a desinfection unit 51 the water 46 is desinfected after which the purified water 52 is supplied through the inlet 3 to the aqua-culture 2 and the recirculation 45 is closed. The excreta from the strainer unit 48 and from the biological purifying unit 50 is conducted away through the duct 82. Through the water inlet 3 an amount of fresh water is constantly supplemented as is required for maintaining a constant amount of water 25 in the device 44.

In nature the Artemia are incited by varying environmental conditions to produce cysts. Under artificial conditions the Artemia can be stimulated to produce cysts by subjecting the Artemia, in accordance with the invention, to a treatment inducing a cyclic cyst production. This treatment may consist of a cyclic reduction of the oxygen concentration, which can be performed by cyclically discontinuing the supply of air to the aqua-culture, by supplying nitrogen instead of air to the aqua-culture and/or by adding substances to the aqua-culture which reduce the oxygen concentration or convert the oxygen contained in the aqua-culture into a form unusable for the Artemia. Finally it is possible to induce a deposition of cysts by adding substances inducing the cyst production to the aqua-culture. Scientific research has shown that the change-over from ovovivi- to oviparous reproduction is induced by stress conditions which stimulate the haemoglobin production (under stress conditions the Artemia become red as a result of the increase in haemoglobin concentration, which compound has a red colour). The deposition of cysts may, if desired, be increased by adding to the aqua-culture iron which is an essential metal for haemoglobin production as a complex, for example, Fe-edta. Under artificial conditions the stress conditions stimulating the haemoglobin production may be imitated by applying an oxygen stress consisting of the cyclic reduction of the oxygen concentration and, moreover, by raising the salinity in the aqua-culture to at least 90 ppt.

Since the water in the flowing aqua-culture has a residence time of one hour, the excreta produced by the Artemia producing offspring will affect the water quality only to a minor extent. It is now possible to raise the density in the flowing aqua-culture to a high density, for example, of preferably at least 1000 animals per liter. With a density of preferably at least 10.000 animals per liter Artemia offspring can be produced in an economically advantageous manner, whilst with a density of the order of magnitude of preferably 15.000 animals per liter the production is at an optimum. The high density of Artemia results on the one hand in a higher offspring production per cubic meter water and on the other hand an increase in need for oxygen per cubic meter of water. In the case of cyst production this means that during the oxygen stress in the period in which instead of air nitrogen gas is supplied to the aqua-culture the oxygen concentration will drop more rapidly and to a lower value owing to the higher need for oxygen. Consequently water can now be used, the salinity of which is lower, preferably a salinity of 5 to 180 ppt, while it is now also possible to pass natural sea water through the aqua-culture (salinity 35 ppt).

Figure 3:
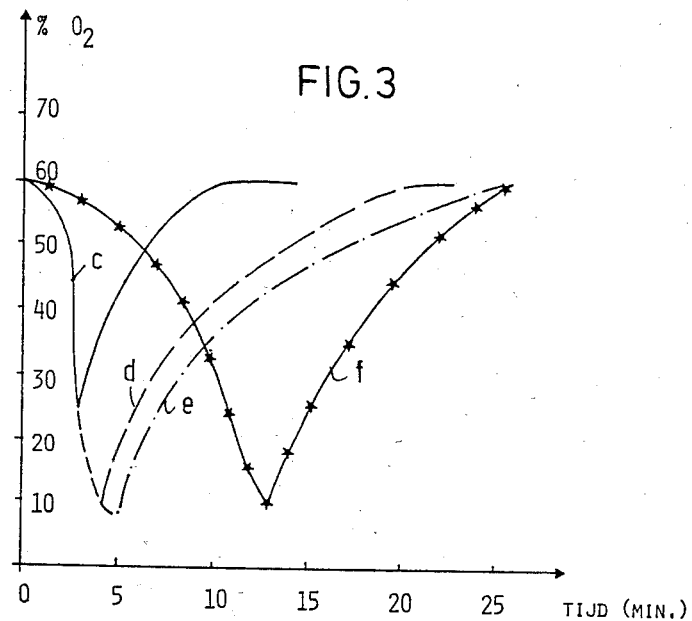
FIG. 3 is a schematic representation as a function of time of an oxygen concentration reduction inducing deposition of cysts in the aqua-culture and FIG. 4 is an enlarged sectional view taken on the line IV—IV in FIG. 2.

FIG. 3 illustrates the decrease in oxygen concentration in the flowing aqua-culture after at the time 0 minutes nitrogen gas is supplied to the aqua-culture rather than air. The lines c, d, e indicate the oxygen concentration as a function of time, when nitrogen gas is supplied for 3, 4 and 5 minutes respectively. From FIG. 3 it is apparent that the minimum oxygen concentration of 10% oxygen saturation to be preferred is obtained when nitrogen gas is supplied for at least 4 minutes. It is furthermore apparent that the whole stress period (oxygen deficiency) is at a maximum 20 to 25 minutes. This period is so short that an increased mortality of the population due to oxygen deficiency does not or only hardly occurs. The line f indicates that, when the flowing aqua-culture is not covered, the minimum oxygen concentration is attained only after 13 minutes as a result of the transport by means of oxygen diffusion from the open air to the aqua-culture, while constantly supplying nitrogen gas. As a result of the flow in the aqua-culture an optimum oxygen concentration of 60% saturation will be attained within a short time after the nitrogen supply is stopped and air is again supplied, as compared with a batch aqua-culture.

The initial production of cyst is preferably raised by starting the aqua-culture with Artemia not yet sexually mature and by exposing these not yet adult animals to stress conditions, that is to say, reduction of oxygen concentration. In this way the Artemia are prevented from producing nauplii at the first deposition of living offspring.

The production of Artemia offspring per cubic meter may be further enhanced by using, by preference, partenogenetic Artemia strains. Such strains have the advantage that the population is only formed by females so that, as compared with a bisexual strain, the yield per cubic meter is about twice as high. As a partenogenetic strain for example, the Lavalduc strain may be employed.

In the method of producing Artemia offspring in accordance with the invention it is possible to produce Artemia offspring for at least three to four months with the same animals.

In the processing unit 41 (FIGS. 1 and 2) the offspring 14, or 90 is processed in a manner known per se and stored in packings 67. For the cysts 14 the process consists in separating out impurities, such as faeces, empty cyst shells and skins by means of density fractionation with stimulating solutions. The purified cysts are washed with water, dried and packed under nitrogen or in vacuo in packings 67.

Figure 4:
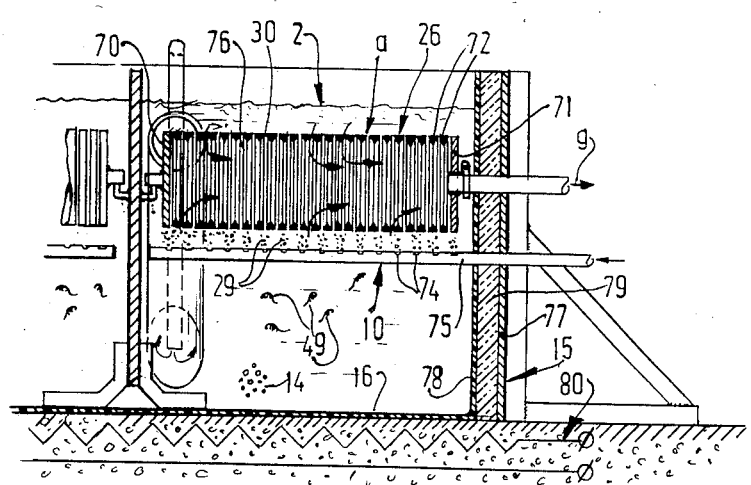

FIG. 4 shows the substantially cylindrical wedge 26 formed by rings 72 of wedge-shaped sections arranged between two circular plates 70 and 71. Between the rings 72 is formed a wedge strainer slot 30 of accurately defined width a. The aerating means 10 comprises a pipe 75 having holes 74. The pipe 75 is arranged below the wedge strainer 26 in a manner such that gas bubbles emanating from the holes 74 flow across a sieving surface 76 along the wedge strainer slots 30. In this way a turbulence is produced in the wedge strainer slots 30 so that clogging of the wedge strainer slots 30 by excreta 9 is avoided.

The wall 9 comprises an aluminium outer layer 77, an inner layer 78 of PVC foil and an insulating layer 79 sandwiched between the two layers 77 and 78. The insulating layer 79 covers the whole outer side of the water basin 5. Heating means 80 are arranged below the bottom 16 of the water basin 5.

Among the offspring produced the nauplii are directly and the cysts are indirectly suitable as a food for larvae of fish or curstacea. The cysts provide, in addition, the possibility of satisfying substantially instantaneously a need for very small living food. By introducing the Artemia cysts into salt water, the cysts develop and within a few hours living nauplii become available. The offspring produced by the method embodying the invention have the advantage that they are produced under controlled conditions so that, in contrast to the offspring produced in nature, no unexpected contamination with toxic substances, such as chlorinated hydrocarbons and heavy metals can occur, which may be toxic by the directly produced nauplii or the nauplii developed from the cysts including toxic substances to the larvae so that the whole fish culture would be destroyed. Moreover, by the method embodying the invention the offspring to be produced may be adjusted in size to specific larvae of fish or crustacea by selecting an Artemia strain in which the size of the nauplii is smaller than the size of the alimentary mouth of the larvae.

It is preferred to adjust not only the biometric size of the nauplii but also the food composition to the alimentary need of the larvae in order to obtain optimum growth of the larvae. For example, a Brasilian Artemia strain may be suitable for the larvae with respect to biometry, but for an optimum growth the cysts produced must have, for example, the lipide composition of a Chinese Artemia strain. Since the food composition is mainly determined by the food and the environment in which the Artemia producing offspring are kept and not genetically determined, it is preferred in the method embodying the invention to add such food additives to the aqua-culture that the food composition of the nauplii corresponds to the food need of the larvae. For example, with a concentration of the fatty acid 20:5ω3 (a fatty acid of 20 carbon atoms and from the third carbon atom 5 conjugated double bonds) by adding a high concentration of this food additive containing lipid, for example, blood to the aqua-culture the concentration of this lipid in the nauplii can be raised and be thus adjusted to the need of the larvae. If the larvae are intended to serve as a food for sole it is preferred to add carotenoids to the aqua-culture so that with respect to the concentration of carotenoids the food composition is improved, as a result of which pigmentation of the skin of the sole is improved.

In a further method embodying the invention the food composition of nauplii obtained from Artemia as a food for larvae of fish or crustacea can be adjusted to the food need of the larvae by adding at least one food additive in the form of particles coated with the food additive to the Artemia obligatorily feeding on particles. Since the Artemia are fed by food originating directly (maize derivative) or indirectly (chicken manure) from terrestric (land) plants and since this terrestric food, for example, with respect to fatty acid pattern, deviates from that of marine food, the food composition of the Artemia offspring is incomplete and the growth of the larvae is delayed. By additionally feeding the Artemia eating obligatorily particles with particles coated with at least one food additive, the particle in itself having poor nutritive value, it is possible to selectively supplement a deficiency of a marine food component, for example, the fatty acid 20:5ω3 so that the food composition of the nauplii is adjusted to the food need of the larvae.

As a food additive fish oil or codliver oil may be used. The food additive is applied to the outer surface of particles, for example, of micronized rice chaff and rice starch grains. Rice starch grains are particularly suitable because these grains have a particle size distribution (2 to 10 μm) lying within the size of the alimentary mouth of the Artemia. Moreover, rice starch grains have satisfactory coating properties, that is to say, the additive satisfactorily adheres to the outer surface of the rice starch grain and disengages the surface only in the alimentary canal of the Artemia. Since the specific weight of the particles is of the order of magnitude of the Artemia containing water, the particles coated with food additive remain floating in the water so that they are readily accessible to the Artemia.

Apart therefrom the particles intended for the Artemia food may be particles of rice chaff, maize derivatives, manioc derivative and/or soya derivatives. In this way the deficient basic food is supplemented by the food additive and a carrier having no or only little nutritive value may be dispensed with.

The particles are coated by charging the food additive in an organic solvent. The particles are subsequently dispersed in the solution containing the food additive, the additive adhering to the outer surface of the dispersed particles. Finally the organic solvent is evaporated, if necessary, at a reduced pressure to obtain the additive-coated particles.

The solvent is chosen so that the food additive is absorbed therein, the particles to be coated do not dissolve therein, the vapour tension of the organic solvent exceeds that of the additive, which permits removing of the solvent by evaporation, and the polarity of the solvent is such that the particles can be dispersed in the solvent. In the case of micronized rice chaff grains the solvent is petroleumether and in the case of rice starch grains acetone or chloroform may be used. Tests have shown that by rice starch grains coated with 10% by weight of codliver oil the food composition of the offspring deposited by Artemia fed on these grains can be adjusted to the food need of the larvae feeding on these offsprings.

The nauplii 90 and cysts 14 respectively produced in accordance with the invention in the devices 1 and 33 and harvested by the harvesting means 11 are purified in the processing unit 41 and stored in a packing 67. The packing 67 containing nauplii 90 or cysts 14 is provided with a label 68. This label has a specification indicating which Artemia strains originate the nauplii or cysts, for which larvae of fish or crustacea they are specifically suitable, in the case of cysts the development characteristics, the food composition and/or a quality mark indicating the concentration of toxic substances, if any.

On the label 68 may be mentioned guaranteed specifications relating to the packed nauplii or cysts because the nauplii or cysts are produced under controlled conditions in the devices 1 and 44 respectively, since in these devices 1 and 44 the relevant parameters affecting the production and the quality of the animals are kept constant within accurately defined limits. The water quality can be kept constant because on the one hand fresh or purified water, both having a constant composition, is supplied to the flowing aqua-culture and on the other hand the residence time of the water in the flowing aqua-culture is so short that the excreta produced by the Artemia within the period does not significantly affect the water quality. Since the devices 1 and 44 are provided with heating means 80, insulated walls 15 and a cover 43, the selected temperature in the flowing aqua-culture can be maintained at an accurately defined value.

A flowing aqua-culture is distinguished from a batch aqua-culture in that the flowing aqua-culture is flushed with water and the water in the flowing aqua-culture is continuously refreshed. The water having passed through the flowing aqua-culture is continuously refreshed. The water having passed through the flowing aqua-culture may be evacuated or be partly or wholly recycled. Before supplying the water again to the flowing aqua-culture the water to be recycled is purified in purifying units and freed of all or substantially all excreta produced by the Artemia during the passage through the flowing aqua-culture. A flowing aqua-culture with complete recirculation of the flowing water is distinguished from a batch aqua-culture comprising a filter unit for separating out particulate excreta in that the recirculated water satisfies the same quality requirements applied to freshly supplied water so that the conditions under which the Artemia are kept in the flowing aqua-culture are constantly the same. In the case of the batch aqua-culture comprising a filter unit for separating out particulate excreta, inter alia the water quality continues decreasing since the start of the aqua-culture despite the removal of the particulate excreta, while the conditions under which the Artemia are kept in this batch culture are not constant, but are deteriorating from the instant of starting of the batch culture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of producing Artemia offspring in which the Artemia depositing offspring are kept in an aqua-culture and the deposited offspring harvested, comprising providing said Artemia in a high density in a flowing aqua-culture under such selected conditions that the Artemia deposit only one selected type i.e. nauplii and cysts.

2. The method of claim 1, wherein the Artemia are kept in a density of at least 1000, preferably at least 10,000 and more, preferably at least 15,000 animals per liter.

3. The method of claim 1, wherein the deposited offspring is harvested from a water stream leaving the flowing aqua-culture.

4. A packing of Artemia off-spring produced according to the matter of claim 1, provided with a label indicating a specification of the packed offspring.

5. The method of claim 1, wherein water containing said produced offspring is conducted out of said flowing aqua-culture through a wedge strainer arranged in said aqua-culture retaining said Artemia and excreta and water containing produced offspring are conducted out of the flowing aqua-culture.

6. The method of claim 5, wherein after harvesting said produced offspring at least a portion of said water conducted away as a carrier of said offspring and excreta is purified and recycled as a recycle stream.

7. The method of claim 1, wherein said Artemia are subjected to a treatment inducsing a cyclic Artemia cyst production.

8. The method of claim 7, wherein said treatment inducing the cyclic cyst production consists of a cyclic reduction of oxygen concentration of said flowing aqua-culture.

9. The method of claim 7, wherein the flowing aqua-culture is flushed with water, the salinity of which lies between 15 and 90 ppt, preferably 35 and 50 ppt, and more preferably with sea water.

10. The method of claim 7, wherein oxygen concentration in the flowing aqua-culture is cyclically reduced in a period from 1 to 6 hours for at the most 30 minutes, a minimum oxygen concentration being attained within 15 minutes, preferably within 6 minutes, which is lower than or equal to 10% of the saturation concentration of oxygen in the flowing aqua-culture.

11. The method of claim 7, wherein oxygen concentration is reduced by supplying nitrogen gas to said flowing aqua-culture.

12. A method of preparing food for larvae of fish or crustacea, whereby nauplii released by the development of Artemia cysts or deposited by ovoviviparous reproduction are fed to the larvae, comprising the production of Artemia cysts or Artemia nauplii in an aqua-culture according to the method of claim 1.

13. The method of claim 12, wherein at least one food additive of a type is added to the aqua-culture such that the food composition of the nauplii corresponds to the food need of the larvae.

14. A method of preparing an animal food comprising nauplii produced by development of cysts or nauplii deposited by ovoviviparous reproduction as set forth in claim 1 in an aqua-culture medium wherein at least one wedge strainer intended to conduct away water containing excreta, is used while retaining the nauplii which are cultivated to obtain Artemia and the cultivated Artemia are subsequently harvested.

15. A method claim 14, wherein the nauplii are grown in a flowing aqua-culture.

* * * * *